(12) United States Patent
Annala

(10) Patent No.: US 7,690,407 B2
(45) Date of Patent: Apr. 6, 2010

(54) SAWING DEVICE AND ITS SAFETY SYSTEM FOR PRECAUTION OF A BREAKING SAW CHAIN

(75) Inventor: Markku Annala, Tampere (FI)

(73) Assignee: John Deere Forestry Oy, Tampere (FI)

( * ) Notice: Subject to any disclaimer, the term of this patent is extended or adjusted under 35 U.S.C. 154(b) by 1170 days.

(21) Appl. No.: 10/521,048

(22) PCT Filed: Jul. 7, 2003

(86) PCT No.: PCT/FI03/00548

§ 371 (c)(1),
(2), (4) Date: Aug. 24, 2005

(87) PCT Pub. No.: WO2004/006654

PCT Pub. Date: Jan. 22, 2004

(65) Prior Publication Data

US 2006/0107804 A1    May 25, 2006

(30) Foreign Application Priority Data

Jul. 12, 2002    (FI)    ................................. 20021379

(51) Int. Cl.
*A01G 23/02* (2006.01)
(52) U.S. Cl. ...................................................... 144/4.1
(58) Field of Classification Search .................. 144/4.1, 144/34.1, 335–338; 30/382
See application file for complete search history.

(56) References Cited

U.S. PATENT DOCUMENTS

| 2,638,944 A | 5/1953 | Woleslagle |
| 2,832,136 A | 4/1958 | Trecker |
| 3,098,511 A | 7/1963 | Consoletti |
| 3,158,956 A | 12/1964 | Gudmundsen |
| 3,254,686 A | 6/1966 | Boyd et al. |
| 3,496,971 A | 2/1970 | Hale |
| 3,542,094 A | 11/1970 | Gibson et al. |
| 3,808,684 A | 5/1974 | Ludwig |
| 3,885,610 A | 5/1975 | Forslund et al. |
| 4,193,193 A * | 3/1980 | Holzworth ................... 30/382 |

(Continued)

FOREIGN PATENT DOCUMENTS

CA    1080586    7/1980

(Continued)

OTHER PUBLICATIONS

Exhibit A—EP 1 528 852 B1, corresponding EP patent which is the subject of the Notices of Opposition (Exhibits B-E).

(Continued)

*Primary Examiner*—Shelley Self
(74) *Attorney, Agent, or Firm*—Quarles & Brady LLP

(57) ABSTRACT

Method and safety device for a breaking saw chain. The safety device includes a protective wall positioned in the vicinity of the drive gear drawing the saw chain that is capable of receiving the movement of the tail of the broken saw chain and guiding the broken saw chain and the tail into the desired direction. The protective wall is moved in phase with a guide bar to hold the protective wall in the correct location during sawing in relation to the saw chain.

17 Claims, 1 Drawing Sheet

U.S. PATENT DOCUMENTS

| | | |
|---|---|---|
| 4,569,135 A | 2/1986 | Morabit |
| 4,783,914 A | 11/1988 | Bowling |
| 4,805,308 A | 2/1989 | Ritola |
| 4,888,872 A * | 12/1989 | Eistrat .................. 30/371 |
| 4,958,670 A | 9/1990 | Johnson |
| 5,179,785 A * | 1/1993 | Nagashima .................. 30/382 |
| 5,735,325 A | 4/1998 | Timperi et al. |
| 5,802,946 A | 9/1998 | Leini |

FOREIGN PATENT DOCUMENTS

| | | |
|---|---|---|
| FI | 4158 | 9/1999 |
| GB | 343888 | 2/1931 |
| GB | 1224437 | 3/1971 |
| SE | 446250 | 8/1986 |
| SE | 467402 | 7/1992 |
| SE | 523625 | 12/2000 |
| SE | 517665 C2 | 7/2002 |
| WO | WO 80/00548 A1 | 4/1980 |
| WO | 98/53666 A1 | 3/1998 |
| WO | WO 98/53666 A1 | 12/1998 |
| WO | WO 02/071833 A1 | 9/2002 |

OTHER PUBLICATIONS

Exhibit B—Notice of Opposition to a European Patent; Opponent: Komatsu Forest AB; dated Jan. 4, 2007.

Exhibit C—Notice of Opposition to a European Patent; Opponent: Rottne Industri AB; dated Jan. 5, 2007.

Exhibit D—Notice of Opposition to a European Patent; Opponent: Ponsse Oyj; dated Jan. 11, 2007.

Exhibit E—Notice of Opposition to a European Patent; Opponent: SP-Maskinder i Ljungby AB; dated Jan. 12, 2007.

Exhibit F—Hultdins SuperSaw 550 F11-10 BSP; Parts Manual; cited in Exhibit E; alleged by opposer to be prior art—alleged date currently uncontested.

Exhibit G—Hultdins SuperSaw 4000S; Parts Manual; cited in Exhibit E; alleged by opposer to be prior art—alleged date currently uncontested.

Exhibit F—Rottne 53-171; exploded view of a chainsaw; cited in Exhibit E; dated Mar. 1988.

Rottne Industri AB; two-page excerpt from manual; Revision Date Mar. 1988.

* cited by examiner

SAWING DEVICE AND ITS SAFETY SYSTEM FOR PRECAUTION OF A BREAKING SAW CHAIN

FIELD OF THE INVENTION

The invention relates to a method in a sawing apparatus of a forest machine for preventing the whipping movement of a saw chain breaking during sawing. The invention relates to a sawing apparatus of a forest machine.

BACKGROUND OF THE INVENTION

In forest machines, a harvester head is typically used, which is arranged to perform the felling of a growing tree and the manipulation of the tree after the felling at the forest work place. When the harvester head is fastened to the end of a boom assembly in a forest machine, its task is to grip an upright standing tree and cut it, allow the movement of the tree substantially onto the horizontal plane in a controlled manner and to delimb and cut the tree. The tree trunk is fed through the delimbing means of the harvester head substantially on horizontal plane in such a manner that the travel of the tree is stopped at intervals, wherein the tree trunk is cut at a suitable point by means of sawing. The feeding means typically comprise a pair of feeding wheels between which the tree trunk is positioned. The delimbing means comprise one or several pairs of knives, which are positioned around the tree trunk and surround the tree trunk as well as possible. Typically the entire tree, excluding the relatively thin top part, is manipulated in this way.

The saw assembly performing the sawing is mounted substantially in the shield of a saw box. An advantageous saw assembly comprises a frame, a saw motor, a drive gear, a guide bar, a saw chain, a holder for the guide bar and a member for feeding the guide bar outward and inward. The saw motor is arranged to drive the drive gear and during the sawing process the saw chain rotates around the turnable guide bar, driven by the drive gear. The holder of the guide bar is arranged turnable and the outward and inward feeding member is arranged to move the guide bar. In one embodiment the outward and inward feeding member comprises a hydraulic cylinder installed in the saw box, said hydraulic cylinder comprising a piston rod and connection means for transmitting the movement of a piston rod to the turning guide bar holder. Typically, the saw assembly contains sensor means for determining the position of the guide bar, by means of which the movement of the guide bar is determined and restricted. A known felling and delimbing apparatus is disclosed in the patent publication FI 97111 B. Known saw assemblies are disclosed in the publications U.S. Pat. No. 5,802,946 and WO 98/53666.

The saw assemblies of known apparatuses typically contain a shielding saw box with such a construction that the saw assembly is installed in an installation space reserved for the same. Typically, the saw motor is installed partly outside the saw box, and the moving guide bar is positioned inside the saw box, as well as for example the actuator moving the guide bar. The saw box functions as a stationary, load-bearing structure. A known saw box is disclosed in the publication FI 4158 U.

The guide bar is positioned in the saw box in such a manner that its movement path is unobstructed; there is enough room for the guide bar to bend, and sawdust can move out without obstacles. It is, however, necessary to leave enough room in the saw box so that the parts of the saw assembly can be moved and positioned therein, because otherwise detachment and installation at worksite conditions is impossible. The sawdust produced during sawing must exit in a reliable manner from the saw assembly, wherein the saw box is at the plane of movement of the guide bar either as open as possible, or it is provided with a large number of openings via which the sawdust can exit the saw box. In winter conditions, the exit of snow from the saw box must be ensured.

One dangerous situation that occurs in sawing is the breaking of the saw chain. Situations have occurred in which parts are loosened from the breaking chain, single cuffing teeth, side links or drive links, or other parts that fly into the environment, causing danger situations, especially if people or other working machines are located within the recommended safe area or within the flight path of a loosened part. At worksites where several forest machines, for example a harvester and a forwarder are working, it is not always possible to ensure the minimum safety distance.

SUMMARY OF THE INVENTION

It is an aim of the present invention to eliminate the above-presented drawbacks relating to the safety and to the loosening of the parts of the saw chain. The breaking saw chain may also damage the saw box or sawing apparatus, which problem the invention aims at solving. One specific aim is to entirely eliminate such a possibility and situation that parts would be loosened from a broken saw chain, wherein the loosened parts or strong swinging movement of the chain would not cause danger or other damage.

It is a central principle of the invention to prevent the strong swinging movement of the tail of a broken saw chain as well as its return movement, which movement also makes the parts of the saw chain loosen more easily from the broken chain.

Experiments have shown that the loosening occurs for example as a result of such a situation where a cutting tooth of the saw chain is stuck to a tree or meets an obstacle, for example a metal nail. However, the drive gear of the strong saw motor that is in practice a cogged chain wheel, continues to draw the saw chain and tenses the saw chain that yields by stretching slightly, and finally breaks at the point that was stuck, or at the point located between the obstacle and the drive gear. At the sawing point the movement of the saw chain is directed towards the drive gear and in a normal situation it at the same time clings to the tree, thus enabling the sawing. After the breaking the saw chain continues its movement in the direction of traction, substantially in the direction parallel to the lower edge of the guide bar, and finally rectilinearly past the drive gear as well. The rotating drive gear that is still positioned against the saw chain at the same time tends to move the saw chain forward and to feed it back on top of the upper edge of the guide bar, but to the opposite direction. The tail of the broken saw chain thus makes a rapid whip-like movement back and forth, as a result of which parts are more easily loosened from the broken tail of the saw chain, which parts fly into the environment.

It is an advantage of the invention to prevent the back-and-forth movement of the saw chain. By means of the walls of the saw box frame it is not possible to prevent the generation of the whip-like movement, wherein loosening of parts and occurrence of flying parts is possible. It is not possible to encapsulate the saw box entirely, because sawdust must have access away from the vicinity of the saw box and out of the saw box. Furthermore, the saw box must be sufficiently open so that both maintenance and sawing would be possible. When the shielding of the saw box is increased, the loosening of the parts of the saw chain is not prevented entirely, wherein the danger caused by the same is not entirely eliminated either. The walls of the saw chain also contain openings around whose edges the saw chain is possibly capable of rotating, thus producing a strong whip-like striking movement.

It is an advantage of the invention that it is still possible to use saw boxes of prior art. In their design it is now possible to take into account primarily only the maintenance and other functionality, because the safety device according to the invention, in turn, is responsible for the saw chain. It is an advantage of the invention to control the behaviour of the saw chain, wherein the loosening of parts can be prevented and the damages can be prevented by designing and placing the safety device accurately.

If the safety system is positioned in connection with the guide bar in such a manner that it moves in phase with the guide bar, the safety device of the system, in other words the protective wall is always in the correct position in relation to the saw chain, which would not be possible merely by using the shields of the saw box. Because the rotating movement of the guide bar can also be rather wide, it is advantageous that the safety device moves along with the same. Thus, its size can be kept as small as possible, and it covers a smaller sector-shaped area, wherein it disturbs the travel of sawdust past the safety device less.

The protective wall can be placed close to the drive gear, and thus the chain can be better controlled. Another advantage is that the safety device can also be installed afterwards in sawing apparatuses that are already in use.

BRIEF DESCRIPTION OF THE DRAWINGS

In the following, the invention will be described in more detail with reference to the appended drawings, in which.

DETAILED DESCRIPTION OF THE INVENTION

Figure 1:
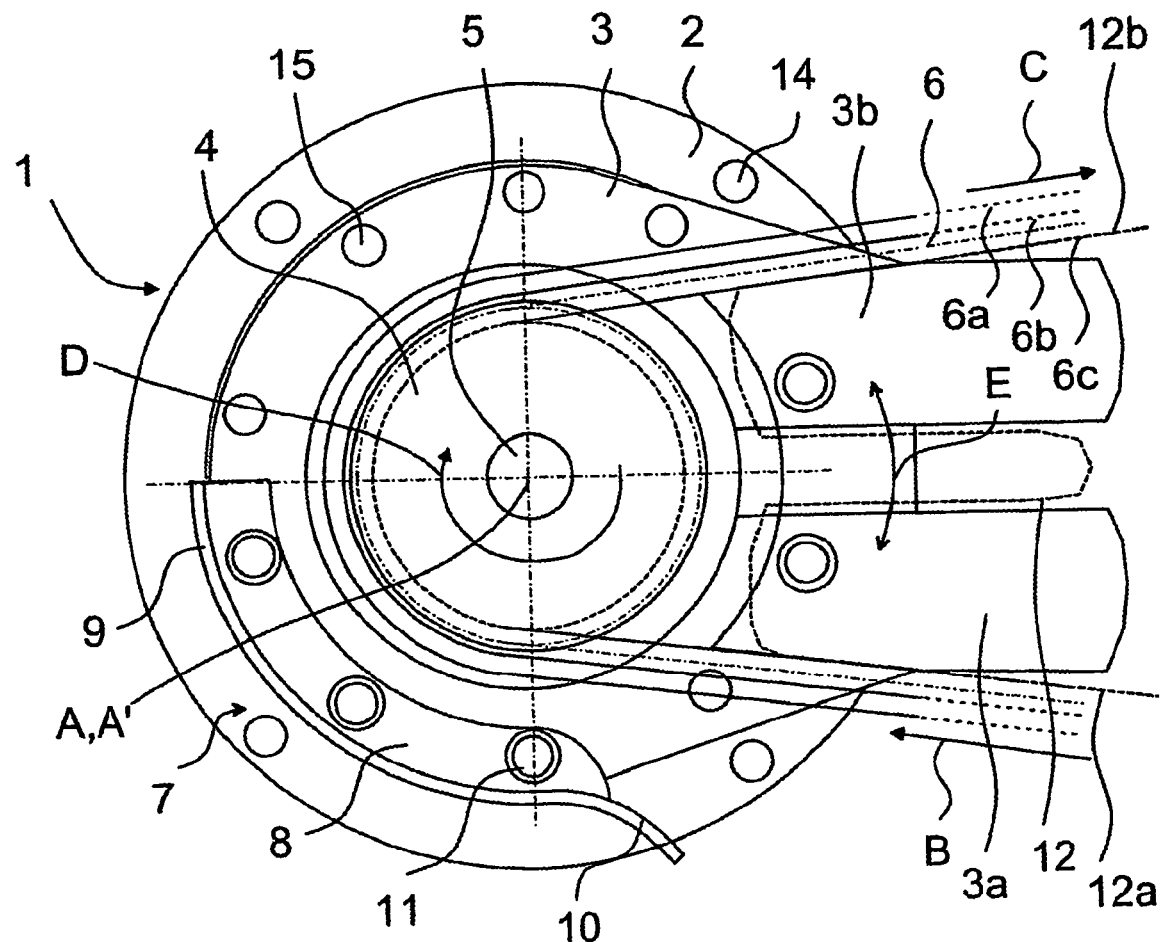
FIG. 1 shows a partial configuration of the sawing apparatus and the safety device installed therein in a side view, when the guide bar is positioned horizontally.

In FIG. 1 the safety system 7 is shown in such a manner that it is fastened to a holder 3 in a sawing apparatus 1, said holder rotating around a rotation axis A. A guide bar 12 is also fastened to the holder 3, which guide bar is shown only partly in FIG. 1 by means of broken lines. For this purpose the holder 3 comprises projecting areas 3a and 3b, against which the guide bar 12 is positioned and pressed with clamping means known as such, which form a part of the holder 3. The structure of the holder 3 is known as such, wherein it complies especially with the publication WO 98/53666. According to another embodiment, the holder 3 is similar to the holder disclosed in the publication U.S. Pat. No. 5,802,946. The type of the holder 3 and its clamping means can also be similar to the other holders of the guide bar, depending on the sawing apparatus in which the safety system is applied. The holder 3 is especially of such a type that it is utilized for turning the guide bar 12 (rotating movement E), wherein the safety device 7 can be fastened directly to said holder structure 3, and it is not necessary to fasten it to a separate part that is moved at the same time when the guide bar 12 is turned. The rotation is conducted around a rotation axis A', which preferably coincides with the rotation axis A, wherein the position of the wall 8 remains exactly the same in relation to the guide bar 12, saw chain 6 and the drive gear 4. Said separate part, or holder 3 forms the necessary means for moving the safety device 7. The movement can also be curved or substantially rectilinear. When the holder 3 is used, it is possible to avoid the use of such separate actuators and means which are intended for movement of the safety device 7. The movement takes place preferably around the rotation axis A in a desired sector area that corresponds to the movement range of the guide bar 12. The rotating movement of the guide bar can be nearly as wide as 90°. For the purpose of the operation and in relation to the saw chain 6, the safety device 7 is always in the correct direction and position, if it is fastened to a part that moves in phase with the guide bar 12.

The holder 3 is moved for example by means of a hydraulic cylinder known as such, either directly or by means of a cogging (not shown in the drawings), or the curved back-and-forth movement of the holder 3 is implemented by means of another, especially hydraulic actuator. The function is preferably arranged in such a manner that the holder 3 rotates around the rotation axis A, which is at the same time the rotation axis of the saw motor 5 and the drive gear 4. The saw motor 5 is typically a hydraulic motor containing a shaft for output of power, to which shaft the drive gear 4 is fastened in the desired manner. In FIG. 1 the saw motor 5 is located behind the drive gear 4 and the holder 3, wherein only the fastening means are exposed thereof, by means of which the drive gear 4 is fastened to the rotating shaft of the saw motor (not shown in the drawings). The drive gear 4 transmits the force of the saw motor to the saw chain 6 that is run forward and around the guide bar 12 in a manner known as such. The drive gear 4 is positioned to one end of the elongated guide bar 12. Normally, the saw chain 6 arrives with a substantially straight movement from the guide bar 12 in the vicinity of the drive gear 4, and rotates around the same. The saw chain 6 changes its movement direction into a substantially opposite one, wherein the direction is opposite on the upper (movement C) and lower sides (movement B) of the guide bar 12. In FIG. 1 the drive gear 4 moves clockwise (rotating movement D) and the rotated section of the saw chain covers a sector that is almost 180° wide on the left-hand side of the drive gear 4 that is opposite to the guide bar 12. The upper edge 12b and the lower edge 12a of the guide bar 12 have a slightly curved shape, and thus the saw chain 6 is not in an absolutely horizontal position in the vicinity of the drive gear 4. The saw motor is located on the opposite side of a ring-like holder 3, and the shaft 5 of the motor extends through the holder 3. The saw chain 6 comprises parts known as such, wherein the travel path of the cutting teeth is illustrated by means of a line 6a, and the upper and lower edges of the drive loops by means of lines 6b and 6c.

The saw motor typically comprises a neck part around which a ball bearing (not shown in the drawings) is positioned, said ball bearing, in turn, being surrounded by the holder 3. Thus, the saw motor remains in its place when the holder 3 rotates and performs a curved movement back and forth during the cutting of the tree trunk, wherein the incoming direction B of the saw chain 6 changes at the same time. The saw motor should move along with the holder 3 in such a case where the rotation axis of the guide bar 12 deviates from the rotation axis A. During the movement of the saw chain 6, the guide bar 12 is at the same time turned towards the tree trunk, which in FIG. 1 is located below the guide bar 12. The cutting teeth of the saw chain 6 cling to the tree, and the chain 6 is pressed against the tree trunk with the force of the guide bar 12 until the tree trunk is cut, and the guide bar 12 is returned into its initial position. The saw motor, in turn, is fastened to the frame 2 of the sawing apparatus, by means of which the sawing apparatus 1, in turn, is fastened for example to the felling and delimbing apparatus or harvester head of a forest machine or a harvester, which is suspended from the boom assembly of the working machine. Between the frame 2 and the holder 3 it is also possible to fasten an actuator that moves the holder 3 in a controlled manner. The holder 3, which comprises for example a toothed rim, is moved for example by a toothed bar positioned in the frame 2. The fastening means 15 illustrate the fastening of the holder 3 to other parts, for example to a bearing that is located between the motor and the holder 3. The fastening means 14 illustrate the fastening of the frame 2. The distance of the guide bar 12 from the drive gear 4 can be adjusted mechanically in a manner known as such by means of the holder 3, for example by means of a spring or hydraulically, so that the tension of the chain 6 could be controlled.

In the embodiment of FIG. 1, the curved wall 9 of the safety device 7 is positioned in the vicinity of the drive gear 4, preferably in a distance of approximately 25 to 30 mm from the chain. The wall 9 is substantially perpendicular to the plane on which the saw chain 6 moves and which is parallel to the guide bar 12. Said plane is parallel to the drawing plane of FIG. 1. Said wall 9 also crosses over said plane, and thus the broken saw chain 6 that moves underneath the drive gear 4 to the left in FIG. 1, hits said wall 9. The wall extends on one hand 25 to 30 mm below the lowest point of the chain 6 and on the other hand substantially on the plane of the axis A, when the guide bar 12 is directed horizontally. Thus, the wall 9 covers an area located at a point where the saw chain 6 is approaching the drive gear 4, meets said drive gear 4 and is curvedly positioned on top of the same. The wall 9 covers a sector area of approximately 90° to 100° starting from the meeting point, at which sector area the saw chain 6 bends around the drive gear 4. The overall height of the wall 9 is thus approximately 80 mm, when the bent extension of the wall 9 or the end 10 increasing the height into approximately 90 mm are not taken into account. The radius of curvature of the saw chain 6 is in this case approximately 50 mm when measured from the axis A. When the radius of curvature changes, the dimensions of the device 7 change accordingly. Together with the extension 10, the size of the sector area is approximately 110°. The aforementioned sector area is the most advantageous one, but it can be extended towards the upper side of the drive gear 4, wherein it covers an angle as wide as 180°. At the same time, however, the travel of sawdust is hindered. The width of the wall 9, in turn, is for example approximately 30 mm, wherein it is approximately twice or three times as wide as the chain 6. The wall 9 is positioned in a relatively central manner with respect to the plane of the guide bar 12 and the drive gear 4.

Figure 2:
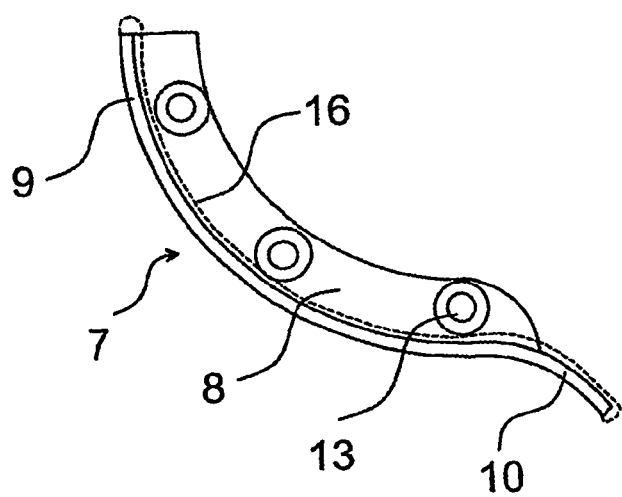
FIG. 2 shows the safety device according to FIG. 1 in a side view.
Figure 3:
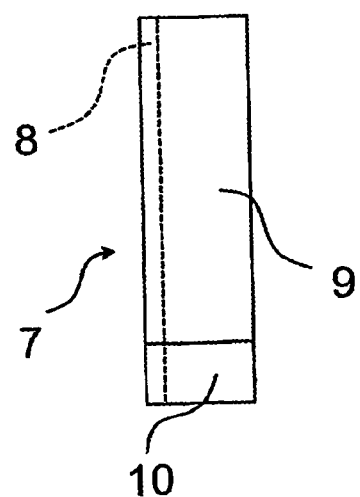
FIG. 3 shows the safety device when seen in the direction shown on the left hand side in FIG. 1.

FIG. 2 shows the safety device 7 on its own, and in a position that corresponds to FIG. 1. In FIG. 3 the safety device 7 is seen from a direction shown on the left-hand side in FIG. 1, whereas the guide bar 12 is parallel to the vertical plane. The cross section of the safety device 7 on such a plane that is perpendicular to the drawing plane of FIG. 1 has substantially the shape of the letter L. The device 7 thus comprises a second wall 8 that also covers a sector area of approximately 110° and that is perpendicular to the first wall 9. The device 7 is fastened to the holder 3 by means of the wall 8 with the desired fastening method, for example with the screw fastening 11 of FIG. 1, wherein the wall 8 contains openings 13, and if necessary also embeddings for this purpose. It is advantageous that the fastening is embedded below the surface of the wall 8, wherein a broken saw chain 6 will not damage the fastening, the saw chain 6 is not broken any further, and the fastening does not interfere with the travel of the broken saw chain 6. It is also possible to implement a structure whose cross section has substantially the shape of the letter U, wherein it contains two parallel walls connected by the wall 9.

The extension wall 10 of the device 7 is curvedly directed downward, so that it would guide the broken and possibly slightly downward fallen saw chain 6 and its tail as smoothly as possible. The inner surface of the wall 9 and the extension 10 is even and continuous, so that the control of the saw chain 6 would be as smooth as possible. The tensed and thereafter broken saw chain 6 continues its movement in the direction of the arrow B, wherein it finally hits the wall 9 and tends to accumulate against it. Especially the wall 9 prevents the movement of the tail of the saw chain 6 from continuing past the gear 4 and the rest of the saw chain. Drawn by the drive gear 4 and possibly also by means of its kinetic energy, the saw chain 6 is guided in a controlled manner by means of the wall 9 on the left side of the drive gear 4 and further above the same, from where it finally falls on the ground. The tail of the saw chain 6 now moves substantially along the same route, and at the same distance from the drive gear 4 as the rest of the chain released from the drive gear 4, and thus the tail is not capable of swinging. Thus, the saw chain 6 does not make a strong movement back and forth, which would stress especially the tail of the saw chain 6 because of strong acceleration. By means of the curved shape the tail of the saw chain diverges in a direction in which it is located closer to the drive gear 4 and more in the direction of the drive gear 4 when compared to such a situation where the movement continues rectilinearly. The deflection begins before the saw chain 6 reaches a plane located by the left edge of the drive gear 4, or immediately thereafter. In the presented embodiment the travel path has a curved shape, and the entire saw chain 6 now follows the same travel path. If parts are detached at the breaking point of the saw chain 6, they hit the saw chain 6 accumulated at the wall 9. The saw chain 6 is not capable of flying to other directions either, if the guide bar 12 has already proceeded deeper into the tree, wherein the saw chain 6 and the guide bar 12 are located within a narrow groove.

In a special embodiment the inner side of the walls of the device 7 is coated with flexible or soft rubber or plastic material that protects the cutting teeth of the saw chain 6 from becoming blunt when the saw chain 6 for some other reason jumps off the drive gear 4 and is not broken. In FIG. 2 the coating 16 of the wall 9 is illustrated by means of a broken line, and it also curves across the front and rear ends of the wall. According to another embodiment, the material of the wall, which is steel material, is annealed in such a manner that the parts of the saw chain 6 are not capable of penetrating thereto, wherein the cutting teeth will not become blunt.

It is obvious that the invention is not limited to the above-presented embodiments, but it can vary within the scope of the appended claims.

The invention claimed is:

1. A method in a sawing apparatus of a forest machine for preventing the whipping movement of a saw chain breaking during sawing, wherein the method comprises the steps of:
   driving the saw chain around a guide bar by using a drive gear positioned on one end of the guide bar, wherein the saw chain moves from the guide bar at the drive gear and rotates back on top of the drive gear, and wherein the guide bar is connected to a guide bar holder,
   conducting the sawing of a tree trunk by rotating the guide bar holder around a first rotation axis with respect to a frame part for turning the guide bar during the sawing, wherein the frame part is configured for supporting the sawing apparatus, and
   moving a protective wall during the sawing of a tree trunk in phase with the rotation of the guide bar to maintain the mutual position of the protective wall and the guide bar, wherein the protective wall is connected to the guide bar holder and positioned in such a manner that the protective wall is capable of receiving the saw chain breaking during the sawing as well as the tail of the broken saw chain, which tend to continue moving past the drive gear, and guiding the saw chain and the tail to a desired direction.

2. The method according to claim 1, further comprising the step of moving the protective wall during the sawing in such a manner that the protective wall is rotated around said first rotation axis together with the guide bar.

3. The method according to claim 1, further comprising the step of guiding the broken saw chain to the desired direction by using the protective wall that is located within a distance from the drive gear, curving in the same direction with the drive gear.

4. A sawing apparatus of a forest machine, comprising:
a frame part for fastening the sawing apparatus,
a saw chain for sawing,
a guide bar around which the saw chain moves,
a guide bar holder configured to rotate around a first rotation axis with respect to the frame part for turning the guide bar during the sawing of a tree trunk, wherein the guide bar is connected to the guide bar holder,
a drive gear positioned on one end of the guide bar for driving the saw chain around the guide bar to perform the sawing, and
a safety system having a protective wall for receiving the saw chain breaking during the sawing, wherein the protective wall is fastened to the guide bar holder for maintaining the protective wall positioned such that the protective wall is capable of receiving the saw chain breaking during the sawing as well as the tail of the broken saw chain, which tend to continue moving past the drive gear, and for guiding the saw chain and the tail to a desired direction.

5. The sawing apparatus according to claim 4, wherein the protective wall is positioned on a side of the drive gear on which the saw chain moves from the guide bar to the drive gear and rotates back on top of the drive gear.

6. The sawing apparatus according to claim 4, wherein the protective wall is located within a distance from the drive gear, curving in the same direction with the drive gear.

7. The sawing apparatus according to claim 4, wherein the first end of the protective wall is located on the side of the incoming saw chain and comprises a wall part curving away from the drive gear and guiding the broken saw chain between the drive gear and the protective wall.

8. The sawing apparatus according to claim 4, wherein the protective wall substantially covers a sector area of 100° to 120°, wherein the central point of the sector area is the first rotation axis.

9. The sawing apparatus according to claim 4, wherein the drive gear is arranged to rotate around the first rotation axis.

10. The sawing apparatus according to claim 4, wherein the protective wall is positioned substantially perpendicularly in relation to the plane coinciding with the guide bar and the movement of the saw chain.

11. The sawing apparatus according to claim 10, wherein the protective wall is fastened to a surface of the guide bar holder which is substantially parallel to said plane.

12. The sawing apparatus according to claim 4, wherein the protective wall has a substantially L-shaped or U-shaped cross section.

13. The sawing apparatus according to claim 4, wherein the protective wall is coated with flexible rubber or plastic material.

14. The sawing apparatus according to claim 6, wherein the first end of the protective wall is located on the side of the incoming saw chain and comprises a wall part curving away from the drive gear and guiding the broken saw chain between the drive gear and the protective wall.

15. The sawing apparatus according to claim 6, wherein the protective wall substantially covers a sector area of 100° to 120°, wherein the central point of the sector area is the first rotation axis.

16. The sawing apparatus according to claim 4, wherein the protective wall is configured to expose the drive gear when viewed in the direction of the first rotation axis.

17. The sawing apparatus according to claim 4, wherein the sawing apparatus further comprises a saw motor for driving the drive gear, wherein the guide bar holder is configured to rotate around the first rotation axis with respect to both the frame part and the saw motor.

* * * * *